Feb. 27, 1968    T. W. BUNYAN    3,370,510
BARREL ENGINE RECIPROCATING TO ROTARY MOVEMENT MECHANISM
Filed Feb. 11, 1966    5 Sheets-Sheet 1

Feb. 27, 1968 T. W. BUNYAN 3,370,510
BARREL ENGINE RECIPROCATING TO ROTARY MOVEMENT MECHANISM
Filed Feb. 11, 1966 5 Sheets-Sheet 3

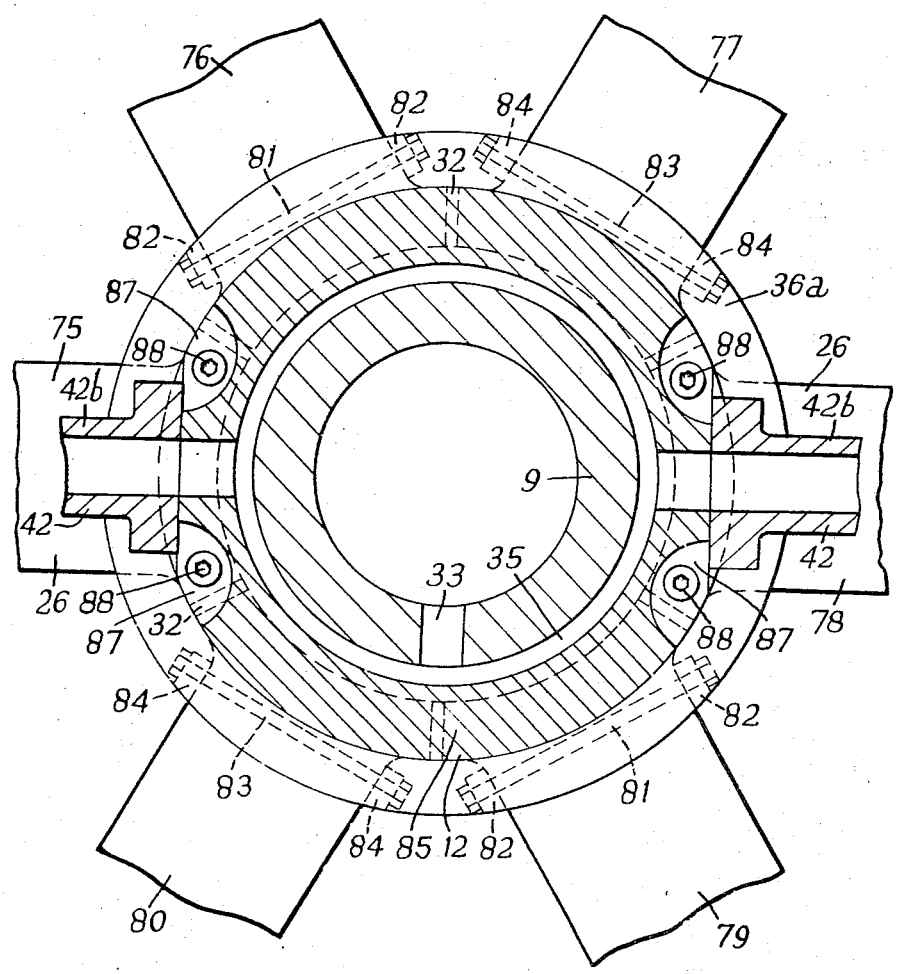

United States Patent Office 3,370,510
Patented Feb. 27, 1968

3,370,510
BARREL ENGINE RECIPROCATING TO ROTARY MOVEMENT MECHANISM
Thomas Walter Bunyan, London, England, assignor to P & O Research and Development Co. Limited, London, England
Filed Feb. 11, 1966, Ser. No. 526,914
Claims priority, application Great Britain, Feb. 17, 1965, 6,782/65
9 Claims. (Cl. 91—175)

ABSTRACT OF THE DISCLOSURE

An engine of the so-called wobbler type in which heavy transverse reaction thrust forces by the outer ends of the rocking arms upon the cross-heads are avoided by the use of a bearing sleeve rotatable on the crank pin and arcuate bearing "palms" on each of the two inner ends of the triangular rocking arms in rubbing contact with the bearing sleeve, the palms in the sets at each end of the sleeve being slightly spaced from one another so as to be capable of movement relative to one another on the sleeve about the axis of the sleeve and at least one rocking arm being connected with the bearing sleeve by a rigid strut so that the palms of that rocking arm are held against movement about the axis of the sleeve.

---

The present invention relates to improvements in engines of the kind embodying cylinder-piston reciprocation units in association with a crank shaft having a crank pin inclined to the axis of the crank shaft and rocker arms providing transmission connection between the cylinder-piston units and the inclined crank pin of the crank shaft. The term engines is to be understood as including steam engines, compression-ignition and spark-ignition engines, pumps and the like.

Such engines are known in which a number of cylinder-piston units are disposed around the crank shaft with the lines of reciprocation parallel to the axis of the crank shaft, the connecting rocker arms being disposed in general planes radial of the axis of the crank shaft and each in direct or indirect bearing engagement at its radially inner end with the inclined crank pin and at its radially outer end through a ball, cylinder or equivalent articulated joint with a reciprocating part of one of the cylinder-piston units.

Conveniently, the cylinder-piston units may each comprise a pair of axially aligned cylinders and one or more reciprocating pistons cooperating therewith, though in some cases the cylinders may constitute the reciprocating members.

It is usual for the cylinder-piston units to be fixedly mounted and for the crank shaft to rotate but in some instances the crank shaft may be fixed and the assembly of cylinder-piston units arranged to rotate about the crank shaft.

It is a primary object of the present invention to provide an improved form of drive connection between the inclined crank pin of the crank shaft and the plurality of rocker arms associated with the similar plurality of reciprocating cylinder-piston units disposed in angular distribution around the crank shaft.

In accordance with the invention an engine of the kind indicated is provided having a bearing sleeve mounted on the inclined crank pin with the crank pin rotatable therein, a plurality of rocker arms disposed in general planes radial of, and in angular distribution about the axis of the crank shaft and each connected at a radially outer end with one of a similar plurality of reciprocatory cylinder-piston units and in bearing engagement at an inner end with the surface of said bearing sleeve, a rigid connection being provided between said bearing sleeve and at least one of said rocker arms such as to prevent relative movement between the said at least one of said rocker arms and the said bearing sleeve in the direction about the axis of the bearing sleeve, whilst relative movement is permitted between said bearing sleeve and at least one another of said plurality of rocker arms in the direction about the axis of the bearing sleeve.

The rocker arms may have the general form of isosceles triangles, the apex of the triangle constituting the radially outer end of the rocker arm and being in articulated connection with the reciprocating part of a cylinder-piston unit and the base angles of the triangles presenting parts of circular arcuate form, hereinafter referred to as palms, the palms on each rocker arm being spaced from one another and making bearing surface engagement with parts of the surface of the bearing sleeve at or near the two ends thereof.

The palms of the plurality of rocker arms at each end of the bearing sleeve are arranged as a substantially cylindrical aggregation in bearing surface engagement with the bearing sleeve but with the axially directed end edge surfaces of adjacent palms spaced from one another.

One, or a selected number, of the rocker arms are rigidly connected e.g. through a rigid strut with the bearing sleeve in a manner preventing relative movement between the bearing sleeve and that one or that selected number of rocker arms in the direction about the axis of the bearing sleeve and thus maintaining a pre-determined fixed location of the bearing sleeve in relation to that one or that selected number of the rocker arms.

Where the number of equally distributed cylinder-piston unit and rocker arm combinations is odd e.g. 3, 5, 7 etc. only one of the rocker arms is provided with the rigid connection with the bearing sleeve. Where the number is even and includes cylinder-piston unit and rocker arm combinations on diametrically opposite sides of the crank shaft, two diametrically opposed rocker arms may be rigidly connected with the bearing sleeve.

The invention is illustrated by way of examples in the accompanying drawings as applied to a six-cylinder and twelve-cylinder compression ignition engine.

In the drawings, FIGURE 1 is a view in side elevation partly in section of the six-cylinder engine, taken on the line I—I in FIGURE 2;

FIGURE 11 is a sectional end view taken on the line XI—XI of FIGURE 10.

Figure 1:
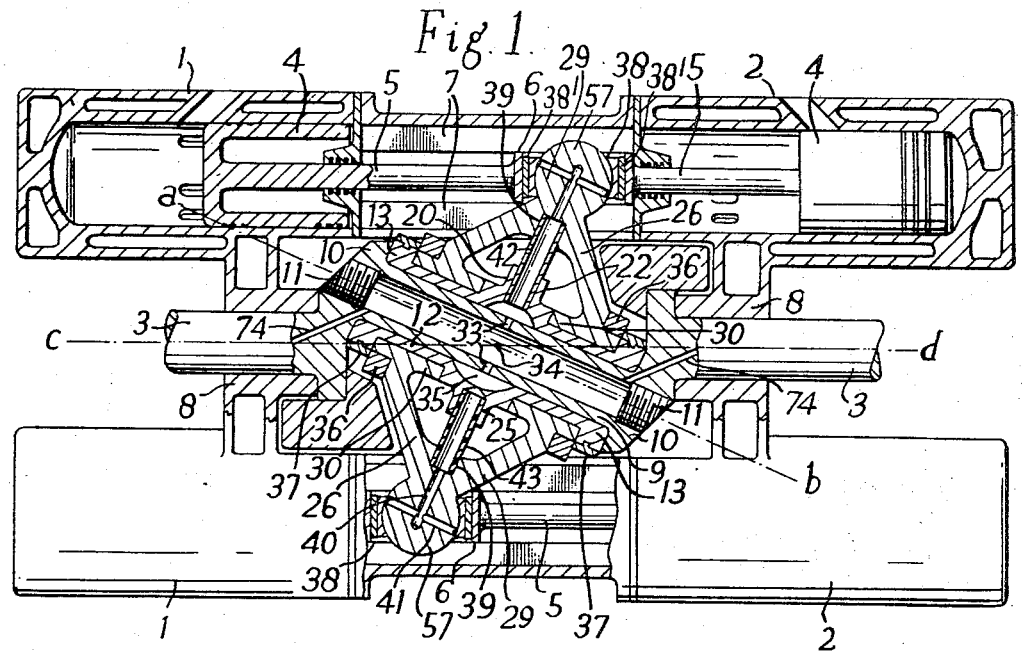
Figure 2:
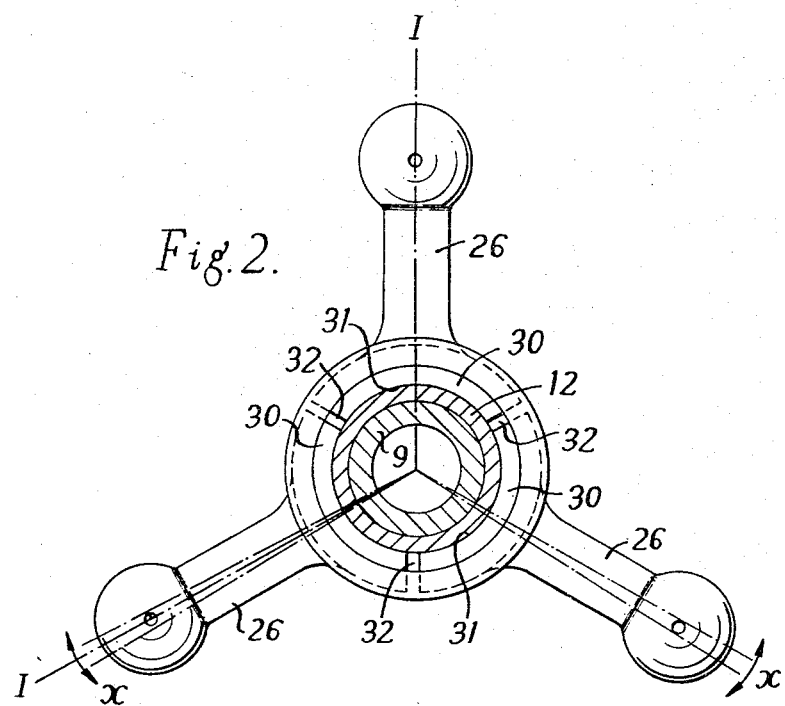
FIGURE 2 is a diagrammatic end view partly in section and on a larger scale, taken on the line II—II of FIGURE 3.

The engine shown in FIGURES 1 and 2 is a six-cylinder engine, the cylinders being arranged in axially-aligned pairs as shown at 1 and 2 in FIGURE 1 with their axes parallel to a crank shaft 3, the pairs of aligned cylinders being in uniform angular distribution about the axis of the crank shaft as shown diagrammatically at 1, 1, 1, in FIGURE 2.

Pistons 4 in the cylinders of each pair 1 and 2 are rigidly connected through piston rods 5 with a cross head 6 arranged for straight line reciprocation between pairs of fixed guides 7 (FIGURES 1 and 7), parallel to the axis of the crank shaft 3.

The crank shaft 3 is mounted for rotation in fixed journal bearings 8 (FIGURE 1) and between the bearings 8 the crank shaft 3 is formed with a hollow crank pin 9 extending between crank webs 10, the axis of the crank pin, indicated by the line a–b in FIGURE 1, being inclined at an angle to the axis, indicated by the line c–d in FIGURE 1, of the crank shaft 3, the ends of the hollow crank pin 9 being closed by screw plugs 11.

The crank pin 9 is surrounded by a bearing sleeve 12 free on the crank pin, the outer surfaces of the ends 13 of the sleeve 12 abutting the surfaces of the crank webs 10 with a small running clearance (not shown).

Figure 4:
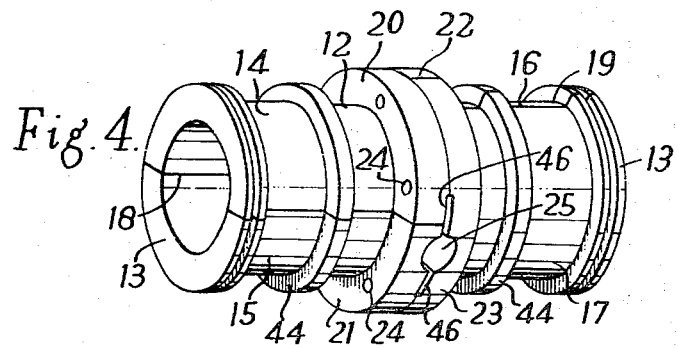
FIGURE 4 is a view in perspective showing one preferred form of bearing sleeve for use on the inclined crank pin.

The bearing sleeve 12 is formed of two pairs of half cylinders 14, 15 and 16, 17 (FIGURE 4) assembled about the crank pin 9 with the junctions between the parts of the two pairs of half cylinders in planes at right angles to one another as indicated at 18 and 19 in FIGURE 4, the parts being provided with flange parts 20, 21, 22 and 23 at the adjacent ends of the two assembled cylindrical parts 14, 15 and 16, 17 secured to one another by axially directed set screws 24 to maintain the bearing sleeve assembled on the crank pin 9.

The flange parts 20, 21, 22 and 23 are machined to provide three radially directed holes 25 in the flange assembly 20, 21, 22 and 23, distributed equally about the axis of the bearing sleeve 12.

Movement is transmitted from the three cross heads 6 reciprocating on straight lines, to the bearing sleeve 12 to drive the inclined crank pin 9 and the crank shaft 3 in rotation, by means of three rocker arms 26 each comprising two similar limbs 27, 28 diverging from a common outer point 29 such that the rocker arms have a general shape conforming to an isosceles triangle of which the common point 29 is the apex while the two limbs 27 and 28 lie on the two sides of the apex angle.

The free ends of the two limbs 27 and 28 of each rocker arm 26 are each furnished with a terminal part 30 presenting a circular arcuate surface 31 (FIGURE 2) of radial curvature similar to the external radial curvature of the part of the bearing sleeve 12 between the flange assembly 20, 21, 22, 23 and the end parts 13.

The arcuate parts 30 constitute the above mentioned palms and the two sets of three palms 30 of the three rocker arms constitute two substantially cylindrical aggregations as shown in FIGURE 2, surrounding and making surface contact with the outer surface of the bearing sleeve 12 at the two ends thereof.

The arcuate lengths of the individual palms 30 is such as to provide gaps between the adjacent ends of adjacent palms in the aggregations extending in the axial direction of the bearing sleeve 12 as shown at 32 in FIGURE 2.

Holes 33 are provided through the wall of the hollow crank pin 9 in a plane normal to the axis a–b of the crank pin 9 and containing the neutral point of bending or rocking of the crank pin, i.e. the point of intersection 34 of the axis a–b of the crank pin 9 and the axis c–d of the crank shaft, these holes 33 leading to a circumferential groove 35 formed in the inner surface of the bearing sleeve 12.

In the case shown in FIGURE 1 the width of the palms 30 in the axial direction corresponds to the distance between the central flange assembly and the end flanges 13 of the bearing sleeve 12 but with a small running clearance at each end and the outer ends of each of the aggregations of palms are surrounded by a securing ring 36 applied past the crank webs 10 and endwise of the bearing sleeve 12 and into engagement with seatings on the limbs 27, 28 of the rocker arms 26, and themselves secured against endwise movement by means of circlips or their equivalent 37 applied in circumferential grooves formed in the outer peripheries of the end flanges 13 of the bearing sleeve 12.

The securing rings 36 may in this embodiment be free to rotate about the ends of the aggregations of palms 30.

Figure 3:
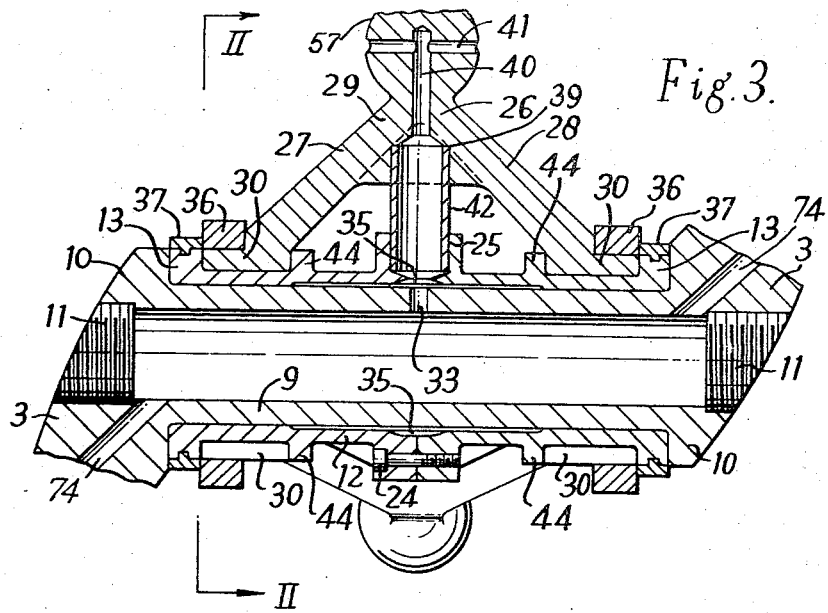
FIGURE 3 is a sectional view in elevation and also on a larger scale showing in greater detail and modified form the connection between one of the rocker arms and the inclined crank pin.

The connection of the rocker arms 26 with the reciprocating cross heads 6 guided in straight lines by the guides 7, in the cases shown in FIGURES 1 and 3 consists of a ball 57 formed or mounted at the apex 29 of the respective triangular rocker arms, the ball being arranged to rock in a part-spherical housing formed by an assembly consisting of two half rings 38 of arcuate cross section on their interior, applied about the ball 57 and themselves held in bearing contact with the ball by a surrounding closed ring 38' the inner end edges of which are spun or peened to maintain the half rings 38 within the outer ring 38'.

The assembly of parts 38 and 38' constitute a block arranged as a sliding fit in a transverse aperture in the cross head 6 so as to be capable of straight line movement in the cross head together with the ball 57, radially towards and away from the axis of the crank shaft 3 during straight line reciprocations of the cross head 6 with its pair of connected pistons 4.

Holes 39 are formed in the apices of the rocker arms 26 on lines bisecting the apex angles and of a diameter similar to that of the holes 25 in the central flange assembly of the bearing sleeves 12, these holes 39 being counterbored as shown at 40 leading to cross bores 41 in the ball 57.

In the case of the engine employing three rocker arms 26 as shown in FIGURES 1 to 8 or any other odd number of rocker arms, a rigid strut such as a steel tube 42 is fitted into the hole 39 at the apex of one of the rocker arms 26 and into one of the holes 25 in the flange assembly 20, 21, 22, 23 of the bearing sleeves 12 so that this one rocker arm 26 and the bearing sleeve 12 are rigidly connected with one another in a manner preventing relative movement between them.

With the other rocker arms 26 the rigid strut connection with the bearing sleeve 12 is omitted but preferably a flexible connection is provided e.g. by the use of tubes 43 of a flexible material such as nylon inserted in the holes 39 in the rocker arms and 25 in the flange assembly of the bearing sleeve 12.

To assemble the transmission system of the above-described engine the four parts of the bearing sleeve 12 are placed in position about the inclined crank pin 9 and the flange parts 20, 21 fixed to the flange parts 22, 23 by means of the set screws 24.

A stiff tubular steel strut 42 is pressed into the radial hole 39 in the apex of one of the rocker arms 26 and that rocker arm applied in position with the other end of the stiff tubular steel strut 42 pressed into one of the radial holes 25 in the central flange assembly 20, 21, 22, 23 of the bearing sleeve 12 and the arcuate surfaces 31 of the palms 30 of that rocker arm in surface engagement with the peripheral surface of the bearing sleeve 12 and the side edges of each palm in engagement with running clearance with one of the end flanges 13 and with one side of the central flange assembly 20, 21, 22, 23.

The other two rocker arms 26 are introduced in a generally similar manner but with the holes 39 in their apices applied with close fit over the outer ends of the nylon or other flexible tubes 43 the inner ends of which are inserted in the two other holes 25 in the central flange assembly so that there is no rigid coupling between these two rocker arms 26 and the bearing sleeve 12 as is the case of the first applied rocker arm 26.

The three palms 30 at each end of the bearing sleeve 12 now constitute a cylindrical aggregation surrounding the bearing sleeve but with gaps 32 between the adjacent end edges of the palms as shown in FIGURE 2.

The retaining rings 36 are now slid into position past the crank webs 10 and the ends of the bearing sleeve 12 and around the outer ends of the cylindrical aggregations of palms 30 and the circlips or equivalent securing rings 37 applied in the peripheral grooves on the end flanges 13 of the bearing sleeve 12.

The connecting engagement between the reciprocating cross heads 6 and the outer ends of the rocker arms 26 may now be made by the introduction of the balls 57 with the blocks comprising part-spherical half rings 38 and surrounding rings 38' previously assembled about the balls 57, into sliding engagement within the transverse apertures in the cross heads 6, as the respective related assemblies each of a pair of cylinders 1 and 2 are placed in position in preparation for bolting up.

In operation thrusts are imparted in sequence by successive rocker arms 26 acting on the peripheral surface and the end flanges and the central flange assembly of the bearing sleeve 12, to rotate the inclined crank pin 9 and crank shaft 3 about the axis $c$–$d$ of the latter and the bearing sleeve 12 is held against free or floating rotational or rocking movement about its own axis $a$–$b$ by virtue of its rigid connection with one of the rocker arms 26 through the rigid strut 42, this connection being such that rocker arm 26 and the bearing sleeve are virtually one-piece.

With an arrangement utilising three rocker arms as described above and shown in FIGURES 1 to 8, given that one rocker arm is rigid with the bearing sleeve and the apex of that same rocker arm is constrained to reciprocate with the straight-line moving cross head, an attempt to utilise similar rigid connections between the other two rocker arms and the bearing sleeve would involve the apices of those other two rocker arms in attempts to describe a path having the form of a figure of eight or in other words attempts to make transverse departures from the straight line of reciprocation of the cross head as indicated diagrammatically by the arrows marked X in FIGURE 2, thus setting up heavy stresses such as to render such an arrangement impracticable.

With the arrangement according to the invention this difficulty does not arise since in the absence of a rigid connection between all but one of the three rocker arms and the bearing sleeve 12 as in the above described example, the palms 30 of those two rocker arms not rigidly connected with the bearing sleeve are free to move to and fro through a small angle about the axis of the bearing sleeve 12 by virtue of the gaps 32 between the palms as shown in FIGURE 2 so that the apices of those non-rigidly connected rocker arms are permitted to reciprocate without transverse deviation from the straight line reciprocatory movement of their co-operating cross heads.

The width of the gaps 32 between the palms 39 depends upon the inclination of the axis $a$, $b$, of the crank pin 9 to $c$, $d$, of the crank shaft 3, the length of the crank pin 9 and the radial length of the rocker arms 26.

Lubricating oil under pressure from a suitable conventional oil pump (not shown) is caused to enter through passages provided in the crank shaft 3 and the crank webs 10 (see passage 74 in FIGURES 1 and 3) to the interior of the hollow crank pin 9 and some of the oil passes thence by way of the holes 33 in the wall of the crank pin to the groove 35, and from the groove 35 to the holes 25 in the central flange assembly of the bearing sleeve 12 and through the tubular steel strut 42 and the nylon or other flexible tubes 43 to the borings 40, 41 in the ball 57 to lubricate the ball joints, the transversely movable block assemblies 38 in the cross heads 6 and the cross heads in their guides 7, the oil from those parts also having access to the palms 30 and the thrust surfaces of the bearing sleeve 12.

In operation the point of intersection 34 of the axes $a$, $b$ of the crank pin 9 and $c$, $d$ of the crank shaft 3 which in FIGURE 1 is coincident with the axis of the hole shown at 33, remains stationary or in other words constitutes a neutral point, and little movement is involved in the parts of the crank pin 9 and the bearing sleeve 12 adjacent that point of intersection and since the bearing sleeve 12 is held against rotation an oil circulating pump may be directly connected through a flexible tube (not shown) with an aperture in the flange assembly of the bearing sleeve 12 to deliver lubricating oil direct to the groove 35 as an alternative to the introduction of lubricating oil through passages 74 in the crank webs as previously described.

In FIGURES 3, 4, 5 and 6 there is illustrated a modified form of the bearing sleeve 12 in which the palms 30 engage the surface of the sleeve between end flanges 13 similar to those of the previously described construction, and one of a pair of further circumferential flanges 44 spaced axially from and on each side of the flange assembly 20, 21, 22 and 23 of the bearing sleeve 12.

Figure 5:
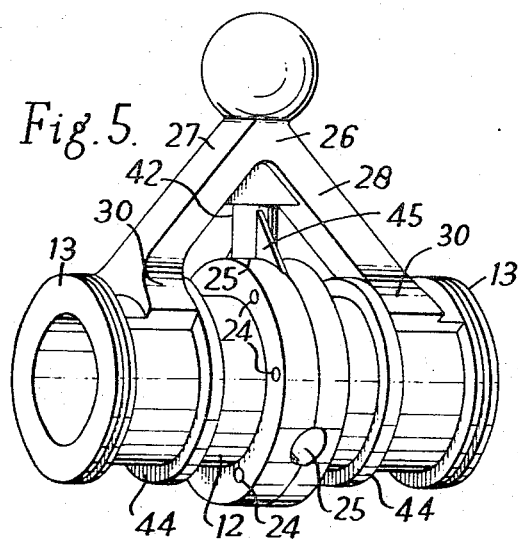
FIGURE 5 is a view in perspective showing the bearing sleev of FIGURE 4 and one rocker arm rigidly attached thereto.
Figure 6:
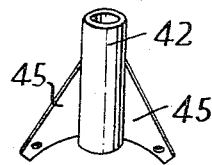
FIGURE 6 illustrates one form of rigid strut for use between the bearing sleeve and the rocker arm of FIGURE 5.

In some cases, to provide improved rigidity in the rigid strut connection between one of the rocker arms 26 and the bearing sleeve 12 and in particular to provide rigidity in the direction transverse to or across the axis of the bearing sleeve 12, the tubular steel strut 42 may be provided with transverse wings 45, FIGURES 5 and 6, projecting ends of which are received in slots 46 (FIGURE 4) formed by grooves machined in the mating faces of parts of the flange assembly 20, 21, 22, 23 of the bearing sleeve 12 and extending at each side of and merging into the appropriate one of the radial apertures 25 in the flange assembly as shown in FIGURES 4 and 5, the wings 45 being clamped in the slots when the parts of the flange assembly are fixed in the assembled condition by the set screws 24.

Figure 7:
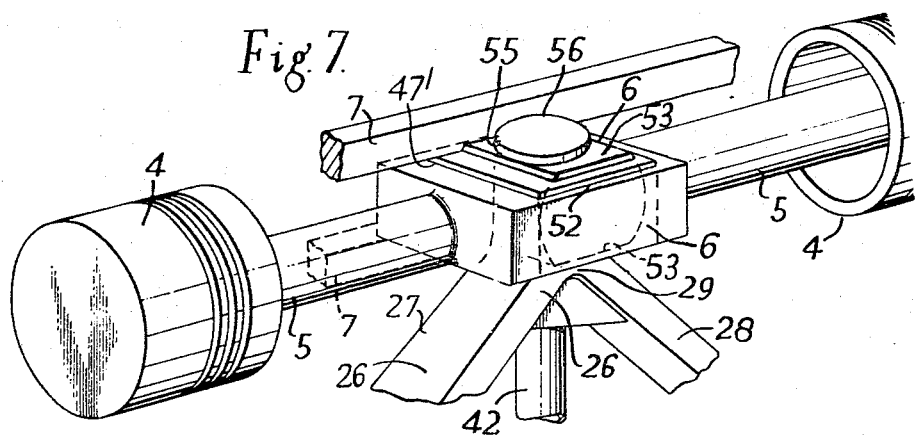
FIGURE 7 is a view in perspective showing a form of connection between a rocker arm and a cylinder-piston unit.
Figure 8:
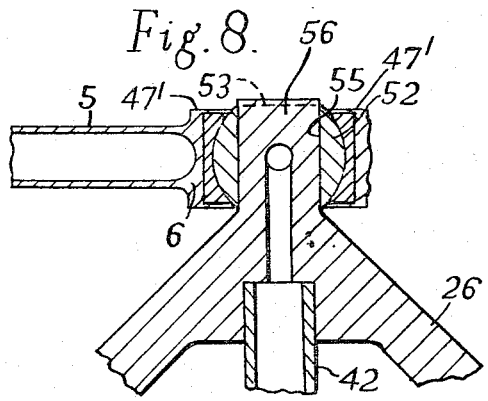
FIGURE 8 shows a detail of FIGURE 7.

In FIGURES 7 and 8 there is illustrated an alternative form of articulated connection between the outer ends of the rocking arms 26 and the straight-line reciprocating cross head 6.

In this case the cross head 6 is machined to provide a recess for reception of a fitting bush 47 the internal surface of which conforms to two facing similar arcuate parts of the surface of a cylinder the axis of which extends transversely at right angles to the line of reciprocation of the cross head 6. The bush 47 is held fixedly in the recess in the cross head e.g. by peening or swaging the outer end edges of the bush 47 over the edges of the recess in the cross head as shown at 47' in FIGURE 8.

In the bush 47 is located a block 52 of general cylindrical form but with two parallel flat end faces 53 on its peripheral surface spaced by a distance enabling the block 52 to be inserted into the bush 47 in the cross head 6 and the block 52 thereafter turned through a right angle about its axis to a position as shown in FIGURE 8 in which it is retained as a snug rotational fit in the part-cylindrical interior of the bush 47.

The cylindrical block 52 is bored transversely of its axis as shown at 55 for the sliding reception of a spigot 56 projecting from the apex of the triangular rocker arm 26.

With this arrangement, the cylindrical block 52 will rock in the cylindrical recess in the bush 47 together with the spigot 56 of the rocker arm 26 as the cross head 6 moves to and fro in a straight line and the spigot 56 will slide in the cylindrical block 52 to allow the required small radial component of movement to the apex of the rocker arm 26.

Figure 9:
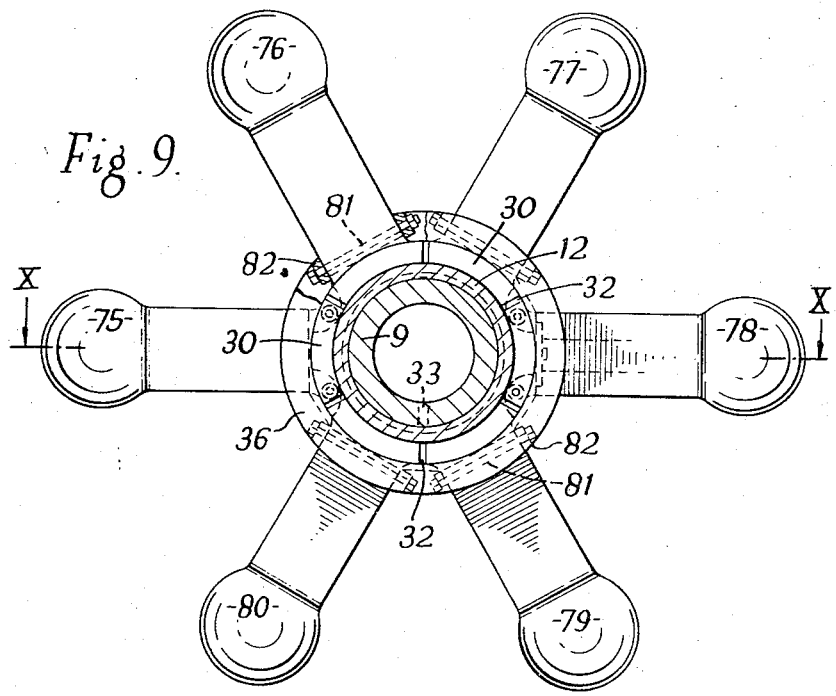
FIGURE 9 is a diagrammatic end view partly in section on the line IX—IX of FIGURE 10 showing the invention applied to a twelve cylinder embodiment of the engine.
Figure 10:
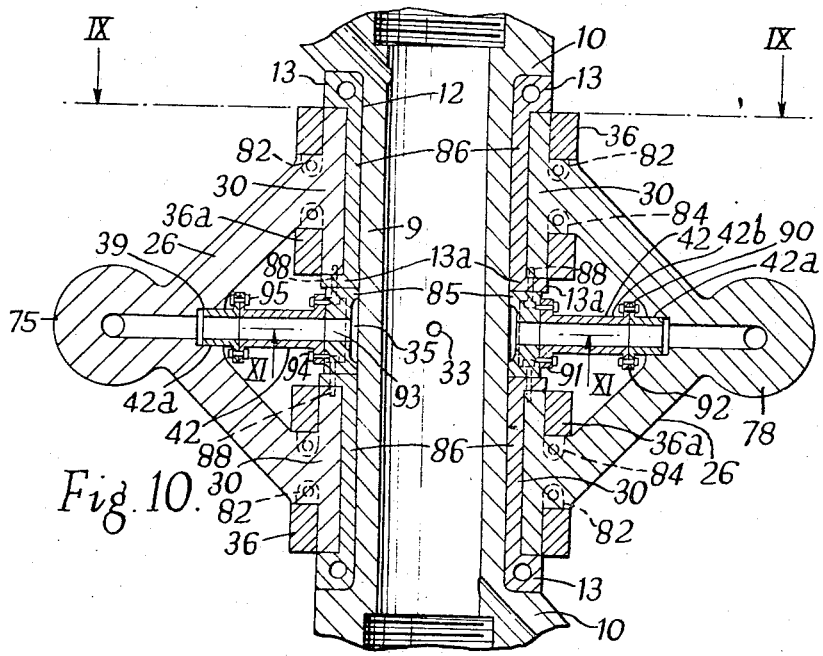
FIGURE 10 is a sectional side elevation of a part of the twelve cylinder embodiment taken on the line X—X of FIGURE 9.

FIGURES 9 to 11 illustrate an arrangement suitable for use in an engine embodying twelve cylinders i.e. six pairs or twin units of axially opposed cylinders, the twin units being in uniform angular distribution about the axis of the crank shaft as indicated by 75, 76, 77, 78, 79 and 80 in FIGURE 9. In FIGURES 9 to 11 the same references are used to indicate parts similar or equivalent to parts in the previously described embodiment.

In this case, since pairs of the twin cylinder-piston units are disposed on diametrically opposite sides of the crank shaft axis, two of the rocker arms 26 co-operating with two of the twin cylinder-piston units on diametrically opposite sides of the crank shaft e.g. those corresponding to units 75 and 78 in FIGURE 9 may both be fixedly connected with the bearing sleeve 12 by means of rigid tubular sruts 42 as in the case of the single rocker arm in the previously described embodiment.

In the twelve cylinder construction shown in FIGURES 9, 10 and 11 the arcuate palms 30 on each end of the six rocker arms 26 form substantially cylindrical aggregations encircling the bearing sleeve 12 as before, with small axially directed spaces 32 between adjacent palms, and in addition to the retainer rings 36 encircling the outer ends of the two aggregations of palms as in the previously described construction, two additional retainer rings 36a (FIGURE 10) are mounted in encirclement of the inner ends of the aggregations of palms.

In this case, the pair of rocker arms 26 corresponding to the pair of diametrically opposite twin cylinder piston units 76 and 79, and which must not be rigidly connected with the bearing sleeve 12, are connected for movement in unison by means of bolts 81 passed through the respective limbs 27 and 28 of those two rocker arms 26 and pairs of spaced lugs 82 (FIGURES 9 and 10) provided on the outer retainer rings 36.

Similarly, the pair of rocker arms 26 corresponding to the pairs of diametrically opposite twin cylinder-piston units 77 and 80, and which also must not be rigidly connected with the bearing sleeve 12, are connected for movement in unison by means of bolts 83 passed through the respective limbs 27 and 28 of those rocker arms 26 and pairs of spaced lugs 84 provided on the inner retainer rings 36a.

Thus, each of the two pairs of diametrically opposite rocker arms not rigidly connected with the bearing sleeve 12, is capable of small angular rocking along with the one or other of the pair of rings 36 and 36a, both independently of one another and relative to the rocker arms 26 rigidly connected with the bearing sleeve 12.

This arrangement is desirable with increase in the numbers of cylinder-piston units and rocker arms used and the consequent increase in the number of palms in each cylindrical aggregation, the reduction in the arc width of individual palms and increase in the tilting moment to sliding force ratio of the rocker arm palms about the bearing sleeve.

In the construction of FIGURES 9 and 11 the bearing sleeve is formed as a built-up structure consisting of a central split ring 85 assembled about the crank pin 9 and two split end tubes 86 having end flanges 13 and 13a, also assembled about the crank pin 9 the outer end flanges 13 abutting the crank webs 10 with small running clearance.

The central split ring 85 is provided on its interior with the circumferential groove 35 communicating with the lubricating oil holes 33 through the wall of the hollow crank pin 9.

The central split ring 85 is provided on its exterior with axially directed stop-ended slots 87 for the reception of set screws 88 (FIGURE 11) engaged in the adjacent flanges 13a of the end tubes 86 whereby the central ring 85 and the end tubes 86 are assembled into a rigid whole.

To facilitate assembly and disassembly the tubular metal struts 42 rigidly connecting two of the rocker arms 26 with the bearing sleeve 12 may in this case be formed of two tubulars parts 42a and 42b the part 42a being a spigot fit in the aperture 39 in the apex of the rocker arm and being provided with a flange 90 on its free end, and the part 42b having two end flanges 91 and 92 one flange 91 seating on a flat surface on the exterior of the central ring 85 and being secured, in register with a hole 93 leading to the circumferential oil groove 35, by screw studs 94 engaged in the central ring 85 and the other flange 92 being bolted to the flange 90 on the part 42a by bolts indicated at 95.

A generally similar fitting may be utilised for flexible, e.g. nylon tubes between other rocker arms 26 not rigidly connected with the bearing sleeve 12.

In the case of the two rocker arms 26 required to be rigid with the bearing sleeve 12, the set screws 88 connecting the central ring 85 of the bearing sleeve with the end tubes 86 may be of a length to pass through the flanges 13a and engage in bored and tapped holes in the adjacent ends of the palms 30 of those rocker arms 26 (FIGURE 10), thus providing increased rigidity in the connection between those two rocker arms and the bearing sleeve.

The constructions described above afford an improved mode of connection between the rocker arms, straight line reciprocating parts of the cylinder-piston units and the crank pin, in that relative movement is permitted between the inner ends of the rocker arms towards and away from one another by virtue of the ability of the palms 30 of those rocker arms 26 which are not rigidly connected with the bearing sleeve 12 to approach and recede from the palms 30 of the rocker arm or arms 26 rigidly connected by a rigid strut 42 with the bearing sleeve 12, as well as to approach and recede from each other and at a frequency which is twice the number of rotations of the crank-shaft 3.

The pressure of one palm of a rocker arm will be towards the crank pin and that of the other palm of that rocker arm away from the crank pin at any given instant and the loading will be taken up consecutively by adjacent rocker arms and is reversed in each rocker arm at top and bottom dead centre for each twin pair of cylinders. Furthermore, these reversals of the load ensure generation and replacement of the lubricating oil film between all relatively moving surfaces and in particular between the palms of the rocker arms and the flanges on the bearing sleeve engaged therewith.

In the case of an engine as described above having similar cylinder-piston units on diametrically opposite sides of the crank shaft axis, e.g. two pairs of axially opposed cylinders in one diametrical plane, four pairs in two diametrical planes, six pairs in three diametrical planes, eight pairs in four diametrical planes and so on, and operating on the two-stroke cycle, oppositely acting cylinders on two opposite sides of the crank shaft may be arranged to work simultaneously so that the gas loads are equal and opposite and no axial thrust is imposed on the crank shaft.

Again, utilising the above described diametrical arrangement of pairs of axially opposed cylinder-piston units, as a two-stroke cycle internal combustion engine, a compressor or a steam engine, the inertia forces arising during reciprocation are always 180° out of phase with the gas loads so that the bearing loads are kept to a minimum at all times, as compared with a conventional type single-acting reciprocating engine in which this out-of-phase condition exists only at top dead centre of the firing or compression stroke, whilst the full effect of the reciprocation inertia forces with increase of bearing loads is encountered at the bottom of the stroke due to absence of any cushioning by gas forces which may be zero or less than zero at this point. With the improved engine according to the invention it is possible to arrange that the reciprocation inertia forces are matched with the gas forces to ensure minimum bearing loads at the speeds for which the engine is designed to run.

The improved engine is capable of being produced of very light weight, compact construction and is capable of operating at very high speeds.

The rocker arms may be constructed to provide a small degree of flexibility between their palms in the axial direction and the firing and inertia loads through any one rocker arm are taken collectively by the thrust faces of the inner and outer flanges engaged by a palm and are shared thereby equally.

I claim:
1. An engine comprising;
a crank shaft embodying a crank pin with the axis of the crank pin inclined to the axis of the crank shaft;
a bearing sleeve mounted on the said inclined crank pin with the crank pin rotatable therein;
a plurality of cylinder-piston units in uniform angular distribution about the axis of the said crank shaft and including reciprocatory parts reciprocating in the general direction parallel to the crank shaft;
a similar plurality of unitary rocking transmission arms of generally isosceles triangular form with the apex angle of each in articulated connection with the reciprocating part of one of the cylinder-piston units;
arcuate palms at each end of the base of the isosceles triangle of each rocking transmission arm, each in bearing engagement with one of two axially separated zones on the surface of the bearing sleeve, the plurality of palms engaging each zone constituting a substantially cylindrical aggregation with the palms in each aggregation spaced by a distance permitting relative movement of limited extent between palms in the direction about the axis of the bearing sleeve and crank pin; and
means rigidly connecting at least one of said rocking transmission arms and the bearing sleeve in a manner preventing relative movement between that rocking transmission arm and its palms relative to the bearing sleeve.

2. An engine as claimed in claim 1;
wherein the means rigidly connecting said at least one of the rocking transmission arms and the said bearing sleeve is formed by a rigid strut fixed at one end to the rocking transmission arms in the region of the apex angle thereof and at the other end to the bearing sleeve at a point midway between the two spaced zones thereon engaged by the aggregations of palms.

3. An engine as claimed in claim 1;
wherein means connecting said at least one of said rocking transmission arms rigidly with said bearing sleeve is a rigid tubular strut fixed at one end to the bearing sleeve in the region of the centre of the length thereof and at the other end to the respective rocking transmission arm in the region of the radially outer end thereof and a flexible tube is provided fixed at one end in the region of the centre of the length of the bearing sleeve and at the other end to at least one other of said rocking transmission arms in the region of the radially outer end thereof, said rigid tubular strut and said flexible tube constituting ducts leading lubricating oil from the region of the centre of the length of the bearing sleeve to the points of connection of the outer ends of the respective rocking transmission arms and reciprocating parts of cylinder-piston units.

4. An engine as claimed in claim 3;
wherein a circumferential lubricating oil channel is formed in the interior of the bearing sleeve in the region of the centre of the length thereof and the said tubular rigid strut and the flexible tube communicate at their radially inner ends with said channel.

5. An engine as claimed in claim 1;
wherein the bearing sleeve is provided with circumferential flanges spaced axially from one another and the axially inner and outer end surfaces of the arcuate palms are in bearing surface engagement with adjacent surfaces of the said flanges.

6. An engine as claimed in claim 1;
wherein retaining rings surround and are in surface engagement with at least one axial end of each cylindrical aggregation of arcuate palms.

7. An engine as claimed in claim 6;
wherein at least one retaining ring surrounding each aggregation of arcuate palms is freely rotatable about the respective aggregation of palms.

8. An engine as claimed in claim 6;
having two cylinder-piston units and two rocking transmission arms associated with said two cylinder-piston units on diametrically opposite sides of the crank shaft and said rocking transmission arms rigidly connected with the bearing sleeve;
at least two further cylinder-piston units and two further rocking transmission arms associated with said further cylinder-piston units on diametrically opposite sides of the crank shaft;
and means fixedly connecting at least one of said retaining rings to two arcuate palms one in each of said further rocking transmission arms.

9. An engine as claimed in claim 8;
wherein two arcuate palms of said two further rocking transmission arms and included on one of said substantially cylindrical aggregations are bolted to a single retainer ring surrounding that substantially cylindrical aggregation.

References Cited

UNITED STATES PATENTS

| 1,411,556 | 4/1922 | Almen | 123—58 |
| 1,610,060 | 12/1926 | Lind | 123—58 |
| 1,732,659 | 10/1929 | Redrup | 123—58 |
| 1,956,944 | 5/1934 | Coombs | 74—60 |
| 2,498,679 | 2/1950 | Hall | 74—60 |

FOREIGN PATENTS

| 2,783 | 1912 | Great Britain. |
| 680,602 | 5/1930 | France. |

WENDELL E. BURNS, *Primary Examiner.*